3,255,237
2-HYDROXYCYCLOHEXYL ESTERS OF LOWER
POLYCHLOROALKANOIC ACIDS
Irving S. Bengelsdorf, Santa Ana, Calif., assignor to United States Borax & Chemical Corporation, Los Angeles, Calif., a corporation of Nevada
No Drawing. Filed Feb. 14, 1963, Ser. No. 258,630
3 Claims. (Cl. 260—487)

This invention relates to novel 2-hydroxycyclohexyl esters of polychloroalkanoic acids and their use as herbicides.

It is, therefore, the principal object of this invention to provide, as new compositions, 2-hydroxycyclohexyl esters of certain polychloroalkanoic acids.

It is a further object of this invention to provide novel herbicidal compositions containing certain 2-hydroxycyclohexyl esters as an active ingredient.

A still further object of this invention is to provide methods for controlling plant growth.

Other objects will become apparent from the following disclosure.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

This invention provides, as new compositions, compounds of the formula

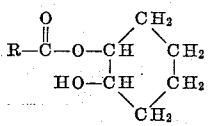

wherein R represents a polychloroaliphatic group of from one to two carbon atoms. Also, it is to be understood that the polychloroaliphatic group has two or more chlorine atoms attached thereto. Compounds represented by the above formula include 2-hydroxycyclohexyl trichloroacetate, 2-hydroxycyclohexyl dichloroacetate, 2-hydroxycyclohexyl $\alpha,\alpha$-dichloropropionate, 2-hydroxycyclohexyl $\alpha,\beta$-dichloropropionate, and 2-hydroxycyclohexyl $\alpha,\alpha,\beta$-trichloropropionate.

The compounds are colorless, crystalline solids or high-boiling liquids, which are soluble in the usual organic solvents, such as the alcohols, cyclohexane and benzene. They are useful as herbicides and as chemical intermediates for preparing other herbicidally active compounds.

The compounds are readily prepared by reaction of the corresponding polychloroalkanoic acid with cyclohexene oxide in substantially equimolar amounts. Elevated reaction temperatures, such as in the range of about 100° to about 160° C., and the addition of a catalytic amount of a tertiary amine, such as benzyldimethylamine, are preferred for best yields with short reaction times. An inert solvent medium, such as the saturated hydrocarbons, can be used for ease of handling the reactants and control of the reaction temperature. The products are isolated and purified by conventional procedures well known to those skilled in the art.

The following examples illustrate the preparation of typical compounds of this invention but it is to be understood that the invention is not to be limited to the specific examples given.

EXAMPLE I 2-hydroxycyclohexyl trichloroacetate

To a solution of 81.7 g. (0.5 mole) of trichloroacetic acid and 3 drops of benzyldimethylamine in 100 ml. of cyclohexane was added 49.1 g. (0.5 mole) of cyclohexane oxide, by drop-wise addition at 70° C. After the addition was completed, the temperature of the reaction mixture was increased to reflux and the mixture refluxed for one hour. The reaction solution was cooled and then washed twice with 100 ml. of distilled water, twice with 100 ml. of a 5% sodium bicarbonate solution and twice again with 100 ml. of water. The cyclohexane solution was then dried over sodium sulfate and the solvent removed by evaporation under reduced pressure to give 56.1 g. of crude crystalline product. Recrystallization from benzene gave 2-hydroxycyclohexyl trichloroacetate, M.P. 63–67° C. The infrared spectrum is consistent with the assigned structure.

EXAMPLE II 2-hydroxycyclohexyl $\alpha,\alpha$-dichloropropionate

To a solution of 71.5 grams (0.5 mole) of $\alpha,\alpha$-dichloropropionic acid and 3 drops of benzyldimethylamine in 100 ml. of cyclohexane was added 49.1 grams (0.5 mole) of cyclohexene oxide, by drop-wise addition at 70° C. After the addition was completed (4 hours), the temperature of the reaction mixture was increased to reflux and the mixture refluxed for one hour. The reaction solution was allowed to cool and the cyclohexane removed by evaporation under reduced pressure. The residue of crude product was taken up in 100 ml. of benzene, washed with 100 ml. of a 5% sodium bicarbonate solution and then washed twice with 100 ml. portions of a saturated sodium chloride solution. The benzene solution was dried over sodium sulfate and the solvent removed by evaporation under reduced pressure to give 78 grams (64.8% yield) of crude, oily product. Distillation under reduced pressure gave 2-hydroxycyclohexyl $\alpha,\alpha$-dichloropropionate, B.P. 105° C./0.32 mm.; $n_D^{23.5}$ 1.4838. The infrared spectrum is consistent with the assigned structure.

The 2-hydroxycyclohexyl esters of this invention are effective herbicidal compounds, useful for controlling the growth of unwanted plants. The compounds are useful as a pre-emergence or post-emergence treatment, that is, they can be used to suppress the growth or kill growing plants, or they can be used to kill or prevent the emergence of seedlings of unwanted plants. Thus, the compounds can be used to control the growth of plants by applying a phytotoxic amount to the locus of said plants, that is, the foliage of growing plants or soil in which the plants are growing or will grow.

An application rate of about 1 to about 200 pounds of the active compound per acre is generally an effective phytotoxic amount, although greater or lesser amounts can be used. The presently preferred application rate is about 20 to about 100 pounds per acre.

Since a relatively small amount of the active compound should be uniformly distributed over the area to be treated, the compounds preferably are formulated with conventional carriers, either liquid or solid. Thus, the compounds can be impregnated on or admixed with a solid carrier, such as lime, talc, clay, bentonite, calcium carbonate, and the like. Also, the compounds can be dissolved or dispersed in a liquid carrier, such as water, kerosene, alcohols, diesel oil, xylene, naphthalene, and the like. A surfactant preferably is included to aid in dispersion, emulsification and coverage. Typical surfactants include the alkylaryl sulfonates, the fatty alcohol sulfates, sodium salts of naphthalene sulfonic acid, long chain quaternary ammonium compounds and sodium salts of petroleum-derived alkylsulfonic acids. In such compositions the active compound is present in a minor amount, such as about 5 to 40 percent by weight, and the carrier present in a major amount.

Other herbicidal materials, such as the alkali metal borates and chlorates and other organic herbicides, can also be included in the formulations.

The following example is presented to illustrate the herbicidal activity of a representative compound of this invention when used as a post-emergence treatment.

EXAMPLE III

Greenhouse flats were planted to corn, oats, ryegrass, mustard, millet, peas, cucumbers and beans. The growing medium was vermiculite, to which 1 liter of a complete nutrient solution (Hoagland's solution) was added at planting and at 10-day intervals thereafter. Nine days after planting, the plants were sprayed with a methanol solution of 2-hydroxycyclohexyl trichloroacetate at a rate of 50 pounds of the active compound per arce and spray volume of 124 gallons per acre. Thirty-four days after treatment, the plants were examined and the herbicidal activity rated as in Table A. The plants were rated on a 0 to 10 basis, with 0 meaning no effect, and 10 meaning total kill of plants.

*Table A*

| Plant specie: | Herbicidal rating |
|---|---|
| Corn | [1] 5 |
| Oats (Kanota) | 0 |
| Ryegrass | 1 |
| Mustard | 1 |
| Millet | 7 |
| Peas | 0 |
| Cucumber | 4 |
| Snap beans | 4 |

[1] Onion leaf.

EXAMPLE IV

In a test to determine the herbicidal activity of 2-hydroxycyclohexyl trichloroacetate as a pre-emergence treatment, the same plant species were planted in a mixture of soil and vermiculite and the soil sprayed with a methanol solution of the compound on the day of planting. An application rate of 54 and 15 pounds of the active compound per acre was used with a spray volume of 124 gallons per acre. Forty-three days after planting and treatment, the plants were examined and rated as in Table B. The rating system was the same as in Example III.

*Table B*

| Plant Specie | Herbicidal Activity at— | |
|---|---|---|
| | 54 lb./a. | 15 lb./a. |
| Corn | 10 | 10 |
| Oats (Kanota) | 5 | 4 |
| Ryegrass | 8 | 4 |
| Mustard | 10 | 4 |
| Millet | 10 | 7 |
| Peas | 5 | 2 |
| Cucumber | 4 | 3 |
| Snap beans | 10 | 4 |

Other modes of applying the principle of the invention may be employed, change being made as regards the details described, provided the features stated in any of the following claims or the equivalent of such be employed.

I, therefore, particularly point out and distinctly claim as my invention:

1. A compound of the formula

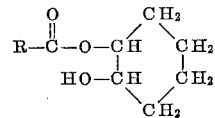

wherein R represents a polychloroaliphatic group having at least two chlorine atoms selected from the group consisting of polychloromethyl and polychloroethyl.

2. 2-hydroxycyclohexyl α,α-dichloropropionate.
3. 2-hydroxycyclohexyl trichloroacetate.

References Cited by the Examiner

UNITED STATES PATENTS

| | | | |
|---|---|---|---|
| 2,554,533 | 5/1951 | Ladd | 260—488 |
| 2,872,452 | 2/1959 | Zeile et al. | 260—487 X |
| 2,923,634 | 2/1960 | Lindemann | 71—2.6 |
| 3,001,861 | 9/1961 | Fischer et al. | 71—2.6 |
| 3,080,417 | 3/1963 | Rosen | 260—487 |
| 3,122,589 | 2/1964 | Webb et al. | 260—487 X |

LORRAINE A. WEINBERGER, *Primary Examiner.*

JULIAN S. LEVITT, LEON ZITVER, J. O. THOMAS, D. P. CLARKE, A. P. HALLUIN, *Assistant Examiners.*